United States Patent [19]

Abe et al.

[11] Patent Number: 4,895,383

[45] Date of Patent: Jan. 23, 1990

[54] METHOD OF AND APPARATUS FOR CONTROLLING CAMBER OF REAR WHEELS OF FOUR-WHEEL-STEERABLE VEHICLE

[75] Inventors: Masaru Abe; Yoshimichi Kawamoto; Takashi Kohata, all of Tochigi, Japan

[73] Assignee: Honda Giken Kogyo Kabushiki Kaisha, Tokyo, Japan

[21] Appl. No.: 184,262

[22] Filed: Apr. 21, 1988

[30] Foreign Application Priority Data

Apr. 21, 1987 [JP] Japan .................. 62-98242

[51] Int. Cl.⁴ .............................................. B62D 7/14
[52] U.S. Cl. ...................... 280/91; 180/140; 180/79.1; 280/661; 280/675
[58] Field of Search ............... 180/140, 79.1; 280/91, 280/661, 675

[56] References Cited

U.S. PATENT DOCUMENTS

| | | | |
|---|---|---|---|
| 3,497,233 | 11/1967 | Bolaski | 280/96.2 |
| 4,313,514 | 2/1982 | Furukawa | 180/140 |
| 4,371,191 | 2/1983 | Goldberg et al. | 280/707 |
| 4,412,594 | 11/1983 | Furukawa | 180/140 |

FOREIGN PATENT DOCUMENTS

| | | |
|---|---|---|
| 1009 | 3/1979 | European Pat. Off. |
| 174007 | 3/1986 | European Pat. Off. |
| 3509440 | 9/1985 | Fed. Rep. of Germany |
| 6185276 | 10/1984 | Japan |
| 6080173 | 4/1987 | Japan .................. 180/140 |
| 1526970 | 10/1978 | United Kingdom |
| 2155869 | 10/1985 | United Kingdom |

OTHER PUBLICATIONS

Fahrewerktechnik, Vogel-Verlag, 1971, p. 169.

*Primary Examiner*—John A. Pekar
*Attorney, Agent, or Firm*—Irving M. Weiner; Joseph P. Carrier; Pamela S. Burt

[57] ABSTRACT

A method of and an apparatus for controlling rear road wheel camber of a four-wheel-steerable vehicle having front and rear road wheels steerable in the same or opposite directions. The camber with respect to ground of at least the rear road wheel on the outer side of a cornering curve followed by the vehicle is controlled. The apparatus includes detectors for detecting the direction in which the rear road wheels are steered with respect to the front road wheels, the self-aligning torque on the front road wheels, and the steering force acting on a steering wheel, camber varying devices associated with rear wheel suspensions, actuators for operating the camber varying devices, and a control unit responsive to detected signals from the detectors for applying a control signal to at least one of the actuators to control the camber of at least the rear road wheel on the outer side of the cornering curve when the rear wheels are steered.

13 Claims, 5 Drawing Sheets

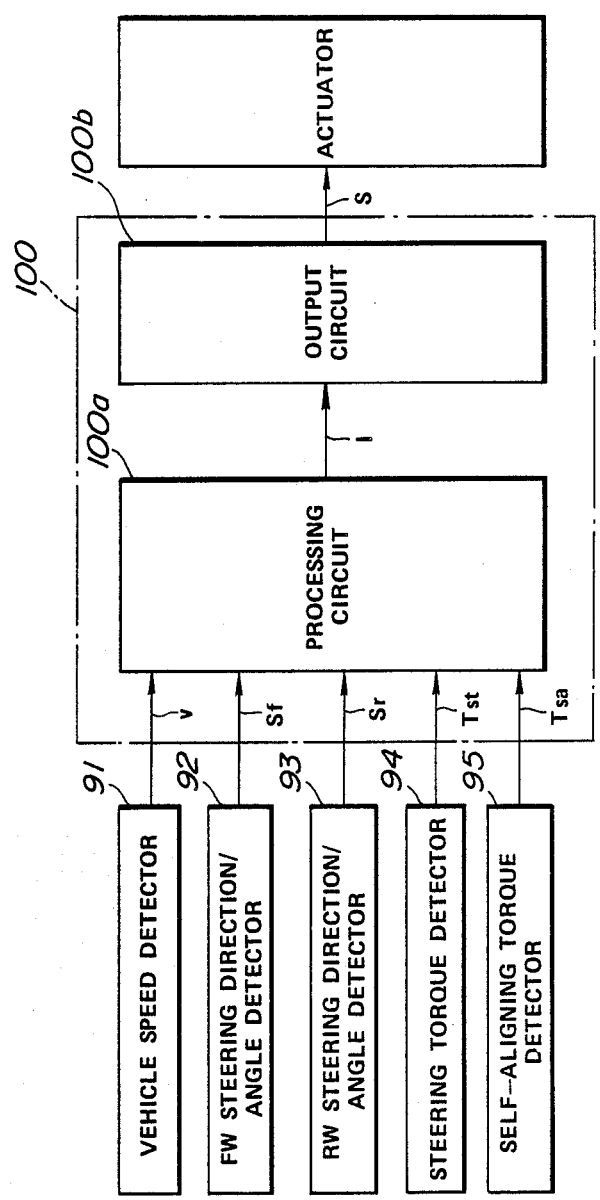

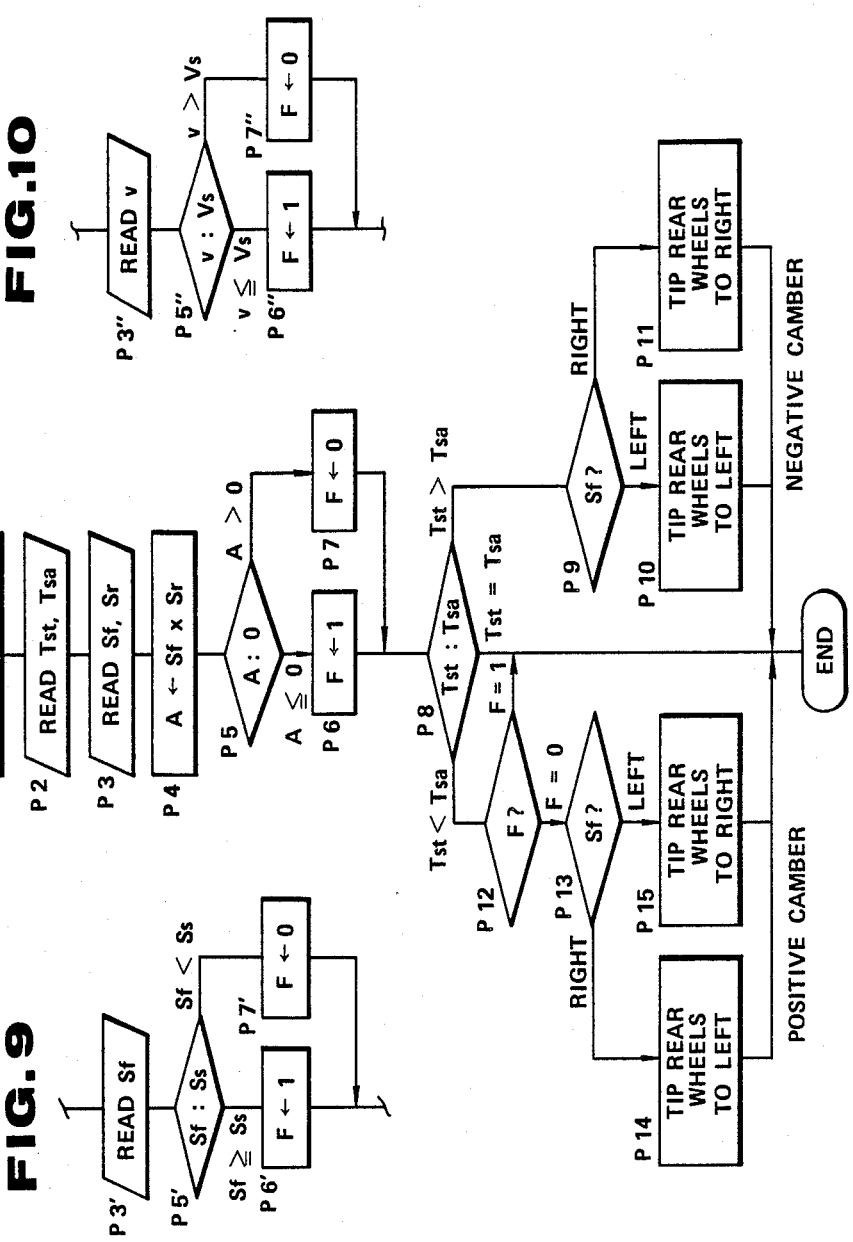

METHOD OF AND APPARATUS FOR CONTROLLING CAMBER OF REAR WHEELS OF FOUR-WHEEL-STEERABLE VEHICLE

BACKGROUND OF THE INVENTION

1. Field of the Invention:

The present invention relates to a method of and an apparatus for controlling the camber of the rear wheels of a four-wheel-steerable vehicle (hereinafter referred to as a "4WS vehicle") with respect to ground.

2. Description of the Relevant Art:

Ordinary two-wheel-steerable vehicles (hereinafter referred to as a "2WS vehicle") have only front wheels steerable with rear wheels not steerable. It has been proposed in U.S. Pat. application No. 51,846, filed May 18, 1987, that the camber of the rear wheels of such a 2WS vehicle is controlled to tilt the rear wheels in the same direction as that in which the front wheels are steered, for thereby imposing a camber thrust on the rear wheels to improve the steering response and cornering capability of the vehicle when it changes its courses or lanes.

U.S. Pat. Nos. 4,313,514 and 4,412,594 disclose 4WS vehicles in which rear wheels as well as front wheels can be steered. The steering response and cornering capability of the 4WS vehicles are increased by steering the rear wheels in the same direction as or opposite direction to the front wheels dependent on the steering angle of the front wheels and the speed of travel of the vehicle.

In the 4WS vehicle, generally, the front and rear wheels are steered in opposite directions when the steering wheel is turned through a large angle in medium and low vehicle speed ranges, and are steered in the same direction when the steering wheel is turned through a small angle in a high vehicle speed range.

SUMMARY OF THE INVENTION

It is an object of the present invention to provide a method of and an apparatus for controlling the camber of the rear wheels, with respect to ground, of a 4WS vehicle in which the rear wheels are steerable in response to the steering of the front wheels, so that a camber thrust generated on the rear wheel positioned on the outer side of a cornering curve is positively utilized to enable the vehicle to run stably during a turn on slippery roads with a low coefficient of friction such as rainy, snowy, and icy roads, to allow a high steering response and a quick return of the steering wheel, and to otherwise improve the maneuvering stability of the vehicle.

To achieve the above object, there is provided a method of controlling rear road wheel camber of a four-wheel-steerable vehicle having front and rear road wheels steerable in the same or opposite directions in response to steering of the front wheels, the method comprising the step of controlling camber, with respect to ground, of at least the rear road wheel on the outer side of a cornering curve followed by the vehicle when the vehicle's rear road wheels are steered.

More specifically, the values of the self-aligning torque (that may be detected from the oil pressure, which is proportional to the self-aligning torque, in a power steering cylinder) on the front wheels and a steering force (which may be detected by a torque sensor) acting on a steering wheel, or numerical information in relation to the above values, is applied to a control unit which generates a control signal to make negative the camber of the rear road wheel on the outer side of the cornering curve while a steering force in excess of the self-aligning torque is being applied to the steering wheel irrespective of whether the front and rear wheels are steered in the same or opposite directions. When the front and rear wheels are steered in the same direction and the self-aligning torque exceeds the steering force on the steering wheel, the control unit controls the camber of the rear road wheel on the outer side of the cornering curve so that the camber is positive.

According to the present invention, there is also provided an apparatus including a detector for detecting at least the direction in which the rear road wheels are steered with respect to the front road wheels, camber varying devices associated with rear wheel suspensions, actuators for operating the camber varying devices, and a control unit responsive to a detected signal from the detector for applying a control signal to at least one of the actuators to control the camber of at least the rear road wheel on the outer side of a cornering curve followed by the vehicle when the vehicle's rear wheels are steered.

When the front and rear road wheels are steered in opposite directions by the steering force on the steering wheel, the camber of the rear road wheel on the outer side of the cornering curve is made negative. Therefore, the cornering force on the rear wheel is increased by the camber thrust to allow the vehicle to run stably when it makes a turn particularly on a slippery road with a low coefficient of friction.

Also when the front and rear road wheels are steered in the same direction by the steering force in excess of the self-aligning torque, the camber of the rear road wheel on the outer side of the cornering curve is made negative. Therefore, the cornering force on the rear wheel is increased to desirably result in a quick steering response, such as when the vehicle changes lanes or courses while running at moderate or high speeds.

When the front and rear road wheels are steered in the same direction and the self-aligning torque exceeds the steering force, the camber of the rear road wheel on the outer side of the cornering curve is made positive and the cornering force produced by steering the rear wheels is canceled out or reduced by the camber thrust. This allows the steering wheel to return quickly, and the vehicle is permitted to settle smoothly and quickly into its intended course of travel.

Accordingly, the 4WS vehicle according to the present invention gains stabler maneuverability.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 7 is a block diagram of a camber control mechanism according to the present invention;

FIG. 8 is a flowchart of a control sequence for camber control in a system in which rear wheel steering direction/angle is detected by a rear wheel steering direction/angle detector;

FIG. 9 is a flowchart of only a portion of a control sequence, which is different from that of FIG. 8, for camber control in a system in which rear steering direction/angle is detected from front wheel steering/angle; and FIG. 10 is a flowchart of only a portion of a control sequence, which is different from that of FIG. 8, for camber control in a system in which rear steering direction/angle is detected from a vehicle speed.

DETAILED DESCRIPTION OF THE PREFERRED EMBODIMENT

Figure 1:
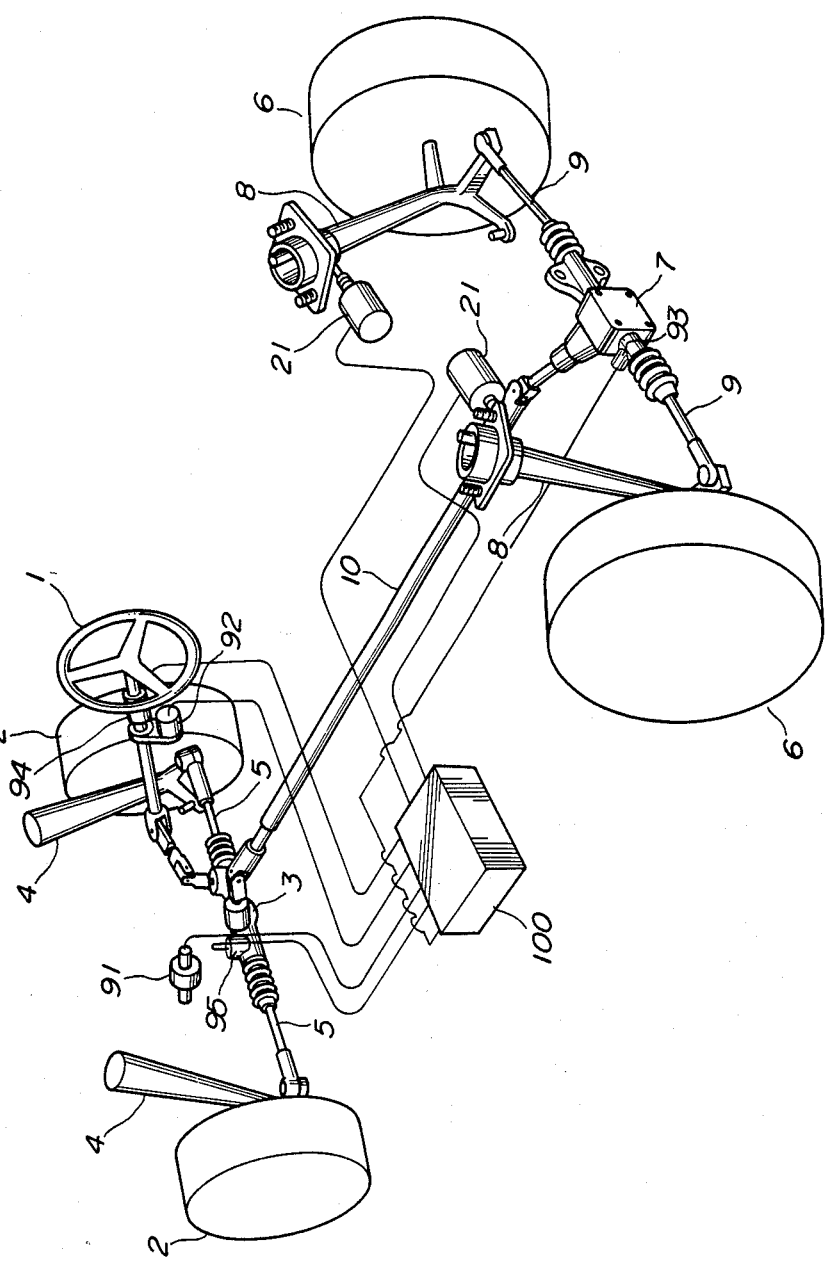
FIG. 1 is a schematic perspective view of a four-wheel steering device which is controlled according to the present invention.

FIG. 1 illustrates a four-wheel steering device incorporated in a 4WS vehicle and having a front wheel steering gearbox 3 and a rear wheel steering gearbox 7. The front and rear wheel steering gearboxes 3, 7 have steering mechanisms housed therein and operatively coupled to each other by a linkage shaft 10. When a steering wheel 1 is turned, the steering mechanism in the front wheel steering gearbox 3 operates a pair of tie rods 5 to turn two front wheels 2 supported by respective suspensions 4. At the same time, the linkage shaft 10 is operated to cause the rear wheel steering mechanism in the gearbox 7 to displace a pair of tie rods 9 to turn two rear wheels 6 supported by respective suspensions 8.

The four-wheel steering device is arranged such that, in response to steering of the front wheels 2, the rear wheels 6 are steered either in the opposite direction to the front wheels 2 when the steering wheel 1 is turned through a large steering angle in medium and low vehicle speed ranges, or in the same direction as the front wheels 2 when the steering wheel 1 is turned through a small steering angle in a high vehicle speed range, based on respective steering angle functions (including variable steering angle ratios).

Figure 2:
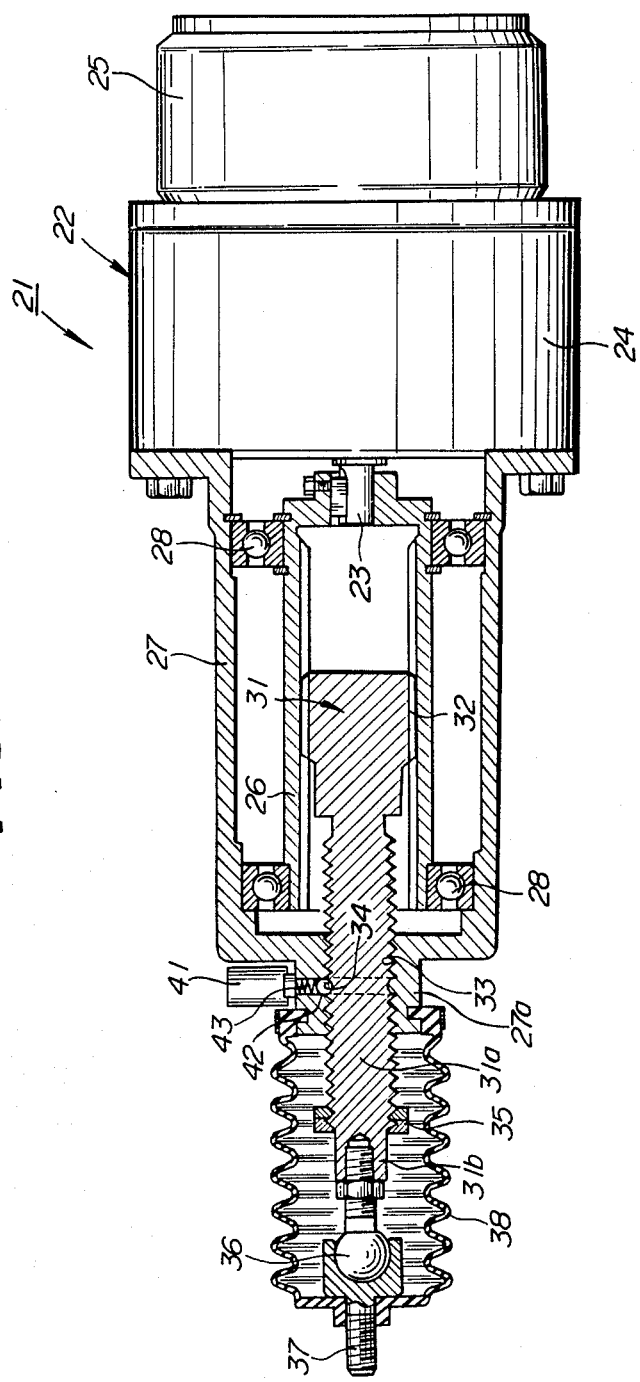
FIG. 2 is an enlarged sectional plan view of an actuator in a camber varying unit of the present invention.
Figure 3:
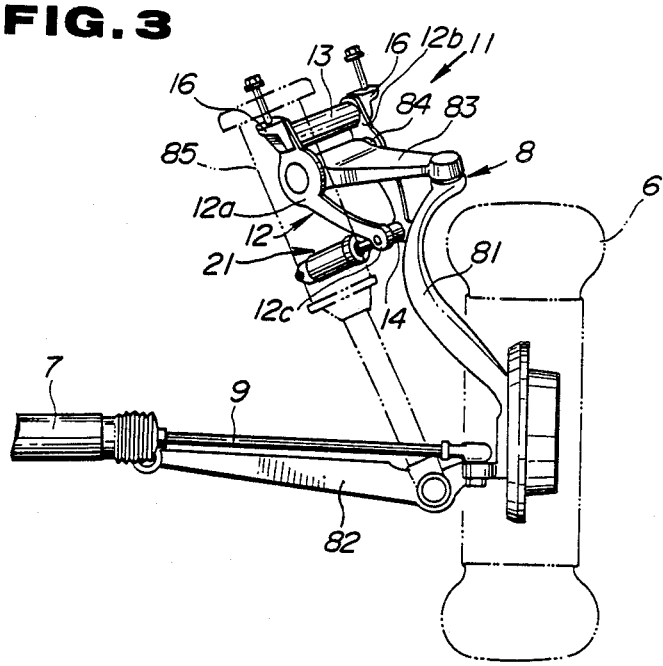
FIG. 3 is a rear elevational view of a rear suspension incorporating the camber varying unit.

The suspension 8 of each of the rear wheels 6 is associated with a camber varying unit 11 as shown in FIG. 3. The camber varying unit 11 is operated by an acutator 21, for example, as shown in FIG. 2.

The acutator 21 is of a motor-operated type and includes a stepping motor 22, an electromagnetic brake 25, a hollow shaft 26, a housing 27, a rod member 31, and other components. The stepping motor 22 with the electromagnetic brake 25 coupled thereto has an output shaft 23 to which the hollow shaft 26 is keyed. The housing 27 is fixed to a motor case 24 of the motor 22 by means of bolts. The hollow shaft 26 is rotatably supported in the housing 27 by means of bearings 28. The rod member 31 has an end axially slidably disposed in and coupled to the hollow shaft 26 by splines 32.

The rod member 31 has an externally threaded rod 31a extending longitudinally thereof threadedly through a threaded hole 33 defined in a bottom 27a of the housing 27, the threaded rod 31a having an outer end portion projecting out of the housing 27. The threaded rod 31a has an annular groove 34 defined in its outer periphery at an axially central position. A ball 42 of a neutral switch 41 normally engages in the groove 34 under the biasing force of a spring 43. On the outer end portion of the threaded rod 31a, there is mounted a double-nut stopper 35 near an outer end 31b of the threaded rod 31a to which a screw member 37 is secured by means of a ball-and-socket joint 36. The projecting end portion of the threaded rod 31a, the stopper 35, and the ball-and-socket joint 36 are covered with a dust boot 38 extending between the screw member 37 and the housing 27.

When the stepping motor 22 is energized, the hollow shaft 26 keyed to the output shaft 23 is rotated about its own axis in the housing 27. The rod member 31 coupled to the hollow shaft 26 by the splines 32 is rotated about its own axis in the threaded hole 33 with respect to the housing 27, and is also axially displaced in the hollow shaft 26. Therefore, the screw member 37 supported on the rod member 31 is axially moved. The screw member 37 is retained in the position reached thereby by the electromagnetic brake 25, which can hold the screw member 37 in place against external forces that may tend to displace the same.

The actuator 21 is controlled in its operation by an ECU 100 (FIG. 1) mounted on the 4WS vehicle. The stepping motor 22, the electromagnetic brake 25, and the neutral switch 41 are electrically connected to the ECU 100.

As illustrated in FIG. 3, the rear suspension 8 is of the double-wishbone configuration comprising a knuckle 81, an I-shaped lower arm 82, an A-shaped upper arm 83, and a damper 85. In the illustrated embodiment, the camber varing device 11 is connected to the upper arm 83. More specifically, the upper arm 83 has a pivot shaft 84 on which an intermediate portion 12a of a bifurcated link 12 is pivotally supported. The link 12 has an upper portion 12b pivotally supported on holders 16 by means of a support shaft 13, the holders 16 being fixed to a vehicle body by bolts. The screw member 37 on the distal end 31b of the rod member 31 of the actuator 21 is threadedly joined to a connecting rod 14 on a lower portion 12c of the link 12.

When the rod member 31 is moved by the actuator 21, the connecting rod 14 is caused by the screw member 37 to turn the link 12 about the support shaft 13, thus displacing the upper arm 83 pivotally supported on the link 12 in the transverse direction of the vehicle. Therefore, the upper end of the knuckle 81 coupled to the upper arm 83 is also displaced in the transverse direction of the vehicle. Accordingly, the camber of the rear wheel 6 supported on the knuckle 81 is varied with repect to ground.

The camber, or the camber angle, of the rear wheel 6 with respect to ground is zero when the ball 42 of the neutral switch 41 engages in the groove 34 of the rod member 31, is positive when the upper arm 83 is displaced outwardly (to the right in FIG. 3) by the rod member 31, and is negative when the upper arm 83 is displaced inwardly (to the left in FIG. 3).

To the ECU 100, as shown in FIG. 1, there are electrically connected a speed detector 91 for detecting the speed of travel of the vehicle, a front wheel steering direction/angle detector 92 mounted on the steering shaft for detecting the direction in, and the angle through, which the front wheel 2 is steered by the steering wheel 1, a rear wheel steering direction/angle detector 93 for detecting the direction in, and the angle through, which the rear wheel 6 is steered from the movement of a rear wheel steering output shaft in the rear wheel steering gearbox 7, a steering torque detector 94 mounted on the steering shaft for detecting the steering force applied to the steering wheel 1, and a self-aligning torque detector 95 mounted in the front wheel steering gear box 3 for detecting the self-aligning torque on the front wheels 2 from the oil pressure in the power cylinder of a power steering mechanism (not shown). These detectors are of known nature.

The ECU 100 comprises a computer mounted on the vehicle. As shown in FIG. 7, the ECU 100 includes a processing circuit 100a for processing detected signals from the detectors 91, 92, 93, 94, 95 applied to the ECU 100, i.e., signals bearing vehicle speed information v, front wheel steering direction/angle information Sf, rear wheel steering direction/angle information Sr, steering torque information Tst, and self-aligning torque information Tsa, to produce control information I, and an output circuit 100b for converting the control information I into an analog signal and amplifying the analog signal. The amplified analog signal from the output circuit 100b is issued from the ECU 100 as a control signal S to the actuator 21 to operate the same.

Since the front and rear wheel steering mechanisms are mechanically operatively coupled to each other by the linkage shaft 10 in the illustrated 4WS device, the direction in which the rear wheels 6 are turned with respect to the front wheels 2 can be detected by detecting the direction in, and the angle through, which the front wheels 2 are steered, with the detector 92. The vehicle speed detector 91 and the rear wheel steering direction/angle detector 93 may be dispensed with as they may not necessarily be required. In a 4WS system wherein the direction in which the rear wheels are steered in response to, but independently of, the steering movement of the front wheels, the vehicle speed detector 91 may be used to function as a rear wheel steering direction/angle detector. However, it is preferable to provide the rear wheel steering direction/angle detector 93 in addition to the front wheel steering direction/angle detector 92.

The amount to which the rear wheel camber is varied may be of a predetermined value or may be made variable dependent on the speed at, or the degree to, which the road wheels are steered.

The ECU 100 is preferably programmed in three different modes with respect to the control of the camber of the rear wheel 6 on the outer side of a cornering curve in a first mode it applies a signal to the actuator 21 to make the camber of the rear wheel 6 negative with respect to ground when the front and rear wheels 2, 6 are steered in opposite directions while a steering force in excess of the self-aligning torque on the front wheels 2 is being applied to the steering wheel 1 (mode 1) in a second mode the ECU 100 applies a signal to make the camber of the rear wheel 6 negative with respect to ground when the front and rear wheels 2, 6 are steered in the same direction while a steering force in excess of the self-aligning torque is being applied to the steering wheel 1 (mode 2). In a third mode and the ECU 100 applies a signal to make the camber positive when the front and rear wheels 2, 6 are steered in the same direction while the self-aligning torque exceeds a steering force applied to the steering wheel 1 (mode 3).

More specifically, the ECU 100 executes a processing sequence for controlling operation of the actuator 21 as described below with reference to FIG. 8. In this control sequence, the output signal from the vehicle speed detector 91, bearing vehicle speed information v, is not employed.

Upon starting the operation sequence, a step P1 effects an initializing process by clearing stored data from an internal register and addressing the same. In a next step P2, the steering force Tst applied to the steering wheel 1 is read from the output signal from the steering torque detector 94, and the self-aligning torque Tsa produced as resistance imposed on the front wheels 2 by the road surface is read from the output signal of the self-aligning torque detector 95. Then, in a step P3, the steering direction/angle Sf of the front wheels 2 is read from the output signal from the detector 92, and the steering direction/angle Sr of the rear wheels 6 is read from the output signal from the detector 93. A step P4 multiplies the steering direction/angle Sf of the front wheels 2 by the steering direction/angle Sr of the rear wheels 6 to obtain a product A, which is then checked for its sign (positive or negative) in a step P5. If the product A is negative or zero, then a flag F is set to 1 in a step P6. If the product A is positive, then the flag F is set to 0 in a step P7. A step P8 then compares the steering torque Tst and the self-aligning torque Tsa. If the steering torque Tst is greater than the self-aligning torque Tsa, then a step P9 checks the steering direction Sf of the front wheels 2. If the front wheel steering direction Sf is "left", then the upper ends of the rear wheels 6 are tipped to the left in the same direction as the front wheel steering direction Sf in a step P10. If the front wheel steering direction Sf is "right", then the upper ends of the rear wheels 6 are tipped to the right in a step P11.

If the steering torque Tst and the self-aligning torque Tsa are equal to each other in the step P8, no camber adjustment is effected for the rear wheel 6. If the steering torque Tst is smaller than the self-aligning torque Tsa, then the flag F is checked in a step P12. If the flag F is 0, then a step P13 checks the steering direction Sf of the front wheels 2. If the front wheel steering direction Sf is "right", then the upper ends of the rear wheels 6 are tipped to the left in the opposite direction to the front wheel steering direction Sf in a step P14. If the front wheel steering direction Sf is "left", then the upper ends of the rear wheels 6 are tipped to the right in a step P15. If the flag is 1 in the step P12, the camber of the rear wheel 6 is not adjusted.

FIG. 9 shows a flowchart of a control sequence to be executed by the ECU 100 for a system in which the steering direction/angle Sr of the rear wheels 6 is detected from the steering direction/angle Sf of the front wheels 2. In the flowchart of FIG. 9, the steps P3, P4, and P5 of FIG. 8 are replaced with steps P3' and P4' for a simpler process. More specifically, after the steering torque Tst and the self-aligning torque Tsa have been read in the step P2 of FIG. 8, only the steering direction/angle Sf of the front wheels 2 is read in the step P3' in FIG. 9, and then the steering angle Sf of the front wheels 2 is compared with a predetermined value Ss in the step P5'. If the steering angle Sf is greater than or equal to the predetermined value Ss, then the flag F is set to 1 in a step P6'. If the steering angle Sf is smaller than the predetermined value Ss, then the flag F is set to 0 in a step P7'. The following sequence step are the same as those of FIG. 8.

FIG. 10 illustrates a flowchart of a control sequence to be executed by the ECU 100 for a system in which the steering direction/angle Sr of the rear wheels 6 is detected from the vehicle speed v. In the flowchart of FIG. 10, the steps P3, P4, and P5 of FIG. 8 are replaced with steps P3" and P4" again for a simpler process.

More specifically, after the steering torque Tst and the self-aligning torque Tsa have been read in the step P2 of FIG. 8, the vehicle speed v is read in the step P3" in FIG. 10, and then the vehicle speed v is compared with a predetermined value Vs in the step P5". If the vehicle speed v is lower than or equal to the predetermined value Vs, then the flag F is set to 1 in a step P6". If the vehicle speed v is higher than the predetermined value Vs, then the flag F is set to 0 in a step P7". The following sequence steps are the same as those of FIG. 8.

Figure 4:
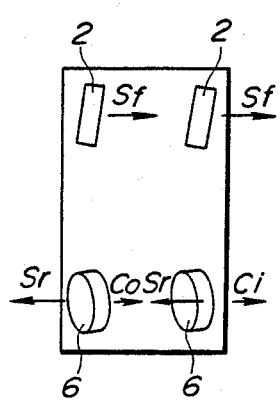
FIGS. 4 through 6 are schematic plan views showing various modes for controlling the camber of rear wheels with respect to ground according to the present invention.

The above control of the camber of the rear wheels in the 4WS vehicle offers the following advantages:

FIG. 4 shows the mode 1 in which the front and rear wheels 2, 6 are steered in the opposite directions (Sf, Sr) and a steering force in excess of the self-aligning torque is applied to the steering wheel 1. The camber Co of the rear wheel 6 on the outer side of the cornering curve is controlled so that it is negative, and the camber Ci of the rear wheel 6 on the inner side of the cornering curve is controlled so that it is positive. Therefore, the tops of the rear wheels 6 are tipped in the same direction as that in which the front wheels 2 are steered and in the opposite direction to that in which the rear wheels 6 are steered, with respect to the vertecal plane normal to the axes of the rear wheels 6. Since the camber Co of the rear wheel 6 on the outer side of the cornering curve is negative with respect to ground, the cornering force of the rear wheel 6 is increased by the camber thrust applied thereto. Therefore, the vehicle is allowed to run stably when it makes a turn, especially on a slippery road with a small coefficient of friction.

Figure 5:
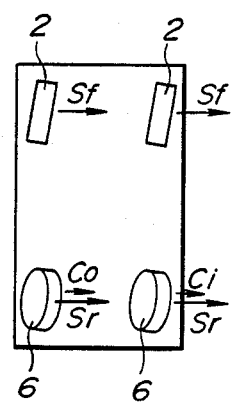

FIG. 5 shows the mode 2 in which the front and rear wheels 2, 6 are steered in the same direction (Sf, Sr) and a steering force in excess of the self-aligning torque is applied to the steering wheel 1. As in the mode 1, the camber Co of the rear wheel 6 on the outer side of the cornering curve is controlled so that it is negative, and the camber Ci of the rear wheel 6 on the inner side of the cornering curve is controlled so that it is positive. Therefore, the tops of the rear wheels 6 are tipped in the same direction as that in which the front and rear wheels 2, 6 are steered. This mode 2 is also illustrated in FIG. 1. Since the camber Co of the rear wheel 6 on the outer side of the cornering curve is negative with respect to ground, the cornering force of the rear wheel 6 is increased by the camber thrust applied thereto. Therefore, the vehicle has a quick response when it changes lanes or courses while running at moderate or high speeds.

Figure 6:
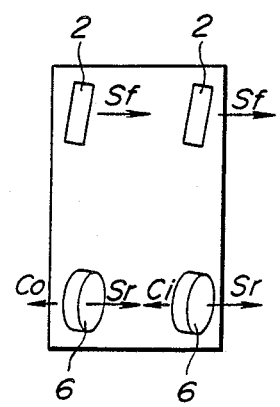

FIG. 6 illustrates the mode 3 in which the front and rear wheels 2, 6 are steered in the same direction (Sf, Sr) but the self-aligning torque exceeds a steering force applied to the steering wheel 1. In this mode, the camber Co of the rear wheel 6 on the outer side of the cornering curve is controlled so that it is positive, and the camber Ci of the rear wheel 6 on the inner side of the cornering curve is controlled so that it is negative. Therefore, the tops of the rear wheels 6 are tipped in the opposite direction to that in which the front and rear wheels 2, 6 are steered. The cornering force produced by steering the rear wheels 6 are canceled out or reduced by the camber thrust applied thereto, so that the steering wheel 1 can quickly be returned and the vehicle can settle smoothly and quickly into its intended course of travel.

With the control modes of the present invention, the maneuvering stability of the 4WS vehicle is increased.

The control modes of the invention are dependent on the relationship between the self-aligning torque and the steering force applied to the steering wheel. However, the camber of the rear wheels may be controlled in exclusive dipender on the self-aligning torque or steering force.

In the 4WS device shown in FIG. 1, the steering mechanisms for the front and rear wheels are mechanically coupled to each other. However, the control of the camber of the rear wheels according to the present invention is also effective in a 4WS device in which the rear wheels are steered by an actuator such as a motor in response to the steering of the front wheels without any mechanical steering linkage between front and rear wheel steering mechanisms.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A method of controlling rear road wheel camber of a four-wheel-steerable vehicle having front and rear road wheels steerable in the same or opposite directions in response to steering of the front wheels, said method comprising the step of:

controlling camber, with respect to ground, of at least a rear road wheel on an outer side of a cornering curve followed by a vehicle when the vehicle's rear road wheels are steered said camber control being effected independently of the steering of the rear road wheels.

2. A method according to claim 1, further including:

a step of detecting at least a self-aligning torque of the vehicle's front road wheels; and said step of controlling camber of at least a rear road wheel is controlled in dependence on the detected self-aligning torque of the vehicle's front road wheels.

3. A method according to claim 2, further including:

a further step of detecting a steering force applied to the vehicle's steering wheel; and said step of controlling camber of at least a rear road wheel is controlled in dependence on a difference between the detected steering force applied to said steering wheel and the detected self-aligning torque of the vehicle's front road wheels.

4. A method according to claim 3, wherein, the camber of the rear road wheel on the outer side of the cornering curve is controlled so that it is negative when a steering force applied to a steering wheel of the vehicle exceeds a self-aligning torque on the front road wheels and the front and rear road wheels are steered in the opposite directions.

5. A method according to claim 4, wherein, when the steering force exceeds the self-aligning torque, the camber of the rear road wheel on the outer side of the cornering curve is controlled so that it is negative even when the front and rear road wheels are steered in the same direction, and when the self-aligning torque exceeds the steering force and the front and rear road wheels are steered in the same direction, the camber of the rear road wheel on the outer side of the cornering curve is controlled so that it is positive.

6. A method according to claim 3, wherein, the camber of the rear road wheel on the outer side of the cornering curve is controlled so that it is negative when a steering force applied to a steering wheel of the vehicle exceeds a self-aligning torque on the front road wheels and the front and rear road wheels are steered in the same direction.

7. A method according to claim 3, wherein, the camber of the rear road wheel on the outer side of the cornering curve is controlled so that it is positive when a self-aligning torque on the front road wheels exceeds a steering force applied to a steering wheel of the vehicle and the front and rear road wheels in the same direction.

8. An apparatus for controlling rear road wheel camber of a four-wheel-steerable vehicle having front and rear road wheels and a steering wheel, said apparatus comprising:
- a front road wheel steering device operatively interconnecting the steering wheel and the front road wheels for steering said front road wheels in response to a steering force applied to said steering wheel;
- a rear road wheel steering device for steering the rear wheels in the same direction as or opposite direction to that in which said front wheels are steered, in response to steering of said front wheels;
- first detector means for detecting at least the direction in which said rear wheels are steered with respect to said front wheels;
- rear road wheel suspensions supporting said rear wheels, respectively;
- camber varying devices operatively coupled to said rear road wheel suspensions, respectively, for varying the camber of said rear wheels independently of the steering of said rear wheels;
- actuators for operating said camber varying devices, respectively; and
- a control unit responsive to a first detected signal from said first detector means for applying a control signal to at least one of said actuators to control camber with respect to ground, of at least the rear road wheel on the outer side of a cornering curve followed by the vehicle when the vehicle's rear wheels are steered.

9. An apparatus according to claim 8, further including second detector means for detecting a self-aligning torque on the front road wheels to apply a second detected signal to said control unit, and third detector means for detecting the steering force applied to said steering wheel to apply a third detected signal to said control unit, said control unit including means for applying a first mode of the control signal to said actuator to make negative the camber of the rear road wheel on the outer side of the cornering curve when the steering force exceeds the self-aligning torque and the front and rear road wheels are steered in the opposite directions.

10. An apparatus according to claim 9, wherein said control unit includes means for applying a second mode of the control signal to said actuator to make negative the camber of the rear road wheel on the outer side of the cornering curve when the steering force exceeds the self-aligning torque and the front and rear road wheels are steered in the same direction.

11. An apparatus according to claim 10, wherein said control unit includes means for applying a third mode of the control signal to said actuator to make positive the camber of the rear road wheel on the outer side of the cornering curve when the self-aligning torque exceeds the steering force and the front and rear road wheels are steered in the same direction.

12. Apparatus according to claim 8, wherein:
said first detector means further detects a self-aligning torque of the vehicle's front wheels.

13. Apparatus according to claim 12, wherein:
said control unit controls the camber of said at least one rear road wheel in dependence on a difference between the detected steering force applied to the steering wheel and the detected self-aligning torque of the vehicle's front road wheels.

* * * * *

UNITED STATES PATENT AND TRADEMARK OFFICE
CERTIFICATE OF CORRECTION

PATENT NO. : 4,895,383

DATED : January 23, 1990

INVENTOR(S) : Masaru ABE et al.

It is certified that error appears in the above-identified patent and that said Letters Patent is hereby corrected as shown below:

On the title page, item [54] and in column 1, line 4, in the title, after "OF" insert --A--.
Column 1, line 3, after "OF" (second occurrence) insert --A--.

Column 5, line 47, change "curve in" to --curve.  In--;
         line 52, change "1) in" to --1).  In--.
Column 8, line 5, change "dipender" to --dependence--.

Signed and Sealed this

Twenty-third Day of July, 1991

Attest:

HARRY F. MANBECK, JR.

*Attesting Officer*                *Commissioner of Patents and Trademarks*